United States Patent [19]
Davis

[11] 3,919,398
[45] Nov. 11, 1975

[54] RECOVERY OF HYDROGEN BROMIDE FROM AROMATIC BROMIDES

[75] Inventor: Ralph A. Davis, Midland, Mich.

[73] Assignee: The Dow Chemical Company, Midland, Mich.

[22] Filed: Aug. 29, 1974

[21] Appl. No.: 501,935

Related U.S. Application Data

[63] Continuation-in-part of Ser. No. 95,883, Dec. 7, 1970, Pat. No. 3,875,293

[52] U.S. Cl. ............................ 423/481; 423/488
[51] Int. Cl.² ........................................ C01B 7/12
[58] Field of Search ............................ 423/481, 488

[56] References Cited
UNITED STATES PATENTS

| | | | |
|---|---|---|---|
| 2,803,669 | 8/1957 | Brainerd, Jr. et al. | 423/481 X |
| 3,199,953 | 8/1965 | Suzuki | 423/481 |
| 3,278,553 | 10/1966 | Weil | 423/481 X |
| 3,453,073 | 7/1969 | Sims | 423/481 |
| 3,705,010 | 12/1972 | Davis | 423/481 |
| 3,839,547 | 10/1974 | McNulty et al. | 423/481 X |

FOREIGN PATENTS OR APPLICATIONS

| | | | |
|---|---|---|---|
| 1,596,725 | 7/1970 | France | 423/481 |

OTHER PUBLICATIONS

"An Outline of Organic Chemistry," Rev. Ed., 1937, by Ed. F. Degering et al., p. 186, Barnes & Noble, Inc., N.Y., publishers.

*Primary Examiner*—Edward Stern
*Attorney, Agent, or Firm*—Robert W. Selby

[57] ABSTRACT

A method of recovering bromine as hydrogen bromide from aromatic bromides. The method involves reacting the aromatic bromide with hydrogen at a temperature within the range of from about 200° to about 600° C in the presence of a palladium activated catalyst.

22 Claims, No Drawings

RECOVERY OF HYDROGEN BROMIDE FORM AROMATIC BROMIDES

BACKGROUND OF THE INVENTION

This is a continuation-in-part of a copending application bearing Ser. No. 95,883, filed Dec. 7, 1970, now U.S. Pat. No. 3,875,293.

This invention relates to aromatic bromides and more in particular to the catalytic recovery of bromine values from aromatic bromides.

Overbromination of benzene and arenes, such as methylbenzene and 1,4-dimethylbenzene, frequently results in an undesired high brominated by-product being produced. For example, when 1,4-dimethylbenzene is brominated with bromine and a ferric chloride or bromide catalyst to produce 2,5-dibromoparaxylene, a substantial quantity of the 2,3-isomer or 2,3,5-tribromoparaxylene by-products can be formed. For ecological and financial reasons it is often-times necessary to convert these and other undesirable aromatic bromide by-products to a more readily commercially usable compound.

It is known that ethylene dibromide can be thermally debrominated or cracked to provide vinyl bromide and hydrogen bromide; however even at 100 per cent conversions only one molecule of hydrogen bromide is produced for each molecule of ethylene dibromide. A catalyzed reduction with hydrogen is necessary to recover the maximum amount of bromine as hydrogen bromide. It has been reported that chlorobenzenes have been reduced in the presence of nickel at temperatures of at least 270°C. However, in this process there is a constant loss of nickel due to the vapor pressure of nickel halides at these higher temperatures. Consequently, the nickel catalyst is rapidly depleted. It is desired to provide a process to recover bromine from organic bromides without forming the substantial amounts of highly brominated by-products of the prior art processes.

SUMMARY OF THE INVENTION

A process to recover bromine values from aromatic bromides has been developed which involves reacting an aromatic bromide with hydrogen at a temperature within the range of from about 200° to about 600°C. This reaction is carried out in the presence of a palladium activated catalyst. The bromine produced can be recovered as anhydrous hydrogen bromide (HBr) suitable for use in other well known processes; for example, the production of methyl bromide and dibromoneopentyl glycol. The aromatic compounds can be recovered and appropriately reused.

DESCRIPTION OF THE PREFERRED EMBODIMENTS

In a preferred embodiment, the aromatic bromides employed have bromine attached to a ring, or side chain in the case of alkaryl bromides, such as brominated xylenes, methylbenzene and 1,4-dimethylbenzene. Examples of such brominated xylenes are 2,3,5-tribromoparaxylene and the 2,3-isomer of 2,5-dibromoparaxylene. It is even more preferred that the aromatic bromide of the present process be brominated 1,4-dimethylbenzene. Examples of other suitable bromides are orthobromotoluene, 4-bromopropylbenzene, 2,5-dimethyltoluene, tribromodiphenyl oxide, tetrabromodiphenyl and brominated diethylbenzene. Thus, alkaryl bromides containing up to 12 carbon atoms are preferred. Selection and use of an organic bromide containing more than 12 carbon atoms is operable, but results in a rapid accumulation of tars in the reaction zone.

In practicing the described process a catalyst selected from a water soluble palladium compound in combination with a member selected from oxides of chromium, vanadium, tungsten, cerium and molybdenum is heated to the desired reaction temperature. A mixture of the aromatic bromide and hydrogen is contacted with the heated catalyst by, for example, flowing the mixture through a catalyst bed. The oxidation state of the metal oxide is not critical. All of the known oxides of chromium, vanadium, molybdenum, and tungsten may be used in combination with the palladium compound. Examples of such oxides are $Cr_2O_3$, $V_2O_3$, $V_2O_5$, $MoO_3$, $Mo_3O_8$, $MoO_2$, $CeO_2$, $WO_2$ and $W_2O_5$. Under the reaction conditions, the metals will be reduced to their lowest reaction state.

Although the palladium activator is effective by itself in amounts as low as the preferred about 0.1 to about 2 weight per cent of the reactants, it is even more effective when combined with the hereinbefore described metal oxides. Such oxides enhance the catalytic effects of the palladium compound and are suitable as a substrate or support for the palladium compound. In one embodiment a catalytic amount of a mixture of the palladium compound, such as an iodide, nitrate, oxide or preferably a chloride, and $Cr_2O_3$ is applied to an alumina support. Most preferably the catalytic mixture contains about 5 to about 25 weight per cent $Cr_2O_3$, about 0.1 to about 1 weight per cent palladium chloride ($PdCl_2$) and about 75 to about 95 weight per cent alumina. Silica gel and charcoal particulate or porous pieces of such materials are examples of other suitable supports. The support particulate is most effective when present in a size within the range of from about 3 to about 20 mesh (Tyler Screen Scale) and a BET surface area of from about 25 to about 700 square meters per gram.

The catalyzed reaction results in the bromine values of the aromatic bromide being converted to readily usable HBr. For substantially complete conversion to HBr, the reaction is carried out at a temperature of from about 280° to about 400°C with a hydrogen ($H_2$) to aromatic bromide molar ratio of at least about 2.0. Generally the molar ratio of hydrogen to the aromatic bromide is from about 1.1 to 1.0 to about 40 to 1.0 and preferably about 1.5 to 1.0 to about 10 to 1.0. Residence time of the aromatic bromide-hydrogen mixture in the heated catalytic reactor, is generally at least about 0.5 seconds, preferably about 0.5 to about 30 seconds and more preferably about 0.5 to about 10 seconds. If some intermediate bromides, such as monobromoxylene and/or dibromoxylenes, are desired, lower molar ratios and temperatures may be used. Temperatures above 550°C increase the amount of carbon formation on the catalyst thereby making relatively frequent regenerations necessary.

EXAMPLE 1

A ¾ inch by 24 inch long Vycor glass tube was packed with 180 cubic centimeters of ¼ inch diameter pellets having a composition of 20 weight per cent $Cr_2O_3$- 80 weight per cent alumina which had been mixed with one gram of $PdCl_2$. The $PdCl_2$ containing catalytic mixture had a BET surface area of about 200 square meters per gram and a density of 70 pounds per cubic feet. The tube was heated to and maintained at a temperature of 300°C in an electric resistance furnace. The heated catalyst was treated with hydrogen for a period of one hour prior to the reaction with a mixture of brominated xylenes.

Twenty grams (0.062 mole) of a mixture of brominated xylenes (by weight, 38 per cent dibromoxylene, 60 per cent tribromoxylene and 2 per cent tetrabromoxylene) containing 66.5 weight per cent $Br_2$ were dissolved in 160 grams of benzene. Such a mixture was made to facilitate feeding of the brominated xylene into the reaction chamber. The reaction can also be carried out using gaseous reactants. The brominated xylene-benzene mixture was introduced into the top of the reactor from a dropping funnel with hydrogen gas being simultaneously metered through the reactor at a position just above the furnace. The xylene-benzene mixture and 30 liters of hydrogen were fed into the reactor and contacted with the heated catalyst during a 1 hour and 10 minute period of time. At this feed rate the residence time of the mixture in the reactor was approximately 5 seconds. The hydrogen to xylene molar ratio was 22 to 1.

The reaction products were passed into and recovered from a water scrubber. Such reaction products included 0.126 mole of HBr, which represented 81 weight per cent of the bromine values fed into the reaction chamber. The remaining reaction product was determined to be 1,4-dimethylbenzene. No monobrominated paraxylene or other brominated xylenes were observed.

COMPARATIVE EXAMPLE A

Substantially as described in Example 1, a 20 weight per cent $Cr_2O_3$-80 weight per cent alumina mixture (no palladium compound) was placed in a Vycor glass tube and heated to 300°C in the presence of gaseous hydrogen for 1 hour. 41 grams (about 0.12 mole) of residue from the distillation of brominated paraxylene (about 98 weight per cent tribromoparaxylene) were dissolved in 150 milliliters of benzene. The benzene mixture was thereafter passed through the heated $CR_2O_3$-alumina mixture confluently with 40 liters (1.8 moles) of gaseous hydrogen while maintaining the catalytic reactor temperature at 300°C. The residence time of the mixture within the reactor was 8.2 seconds and ratio of hydrogen to brominated paraxylenes was about 15 to 1.0.

The products of the reaction were passed directly into a water scrubber where 0.02 mole of HBr was recovered. Such an HBr recovery amounted to 5.5 weight per cent of the bromine values charged into the reactor. The remaining reaction products contained unreacted brominated paraxylenes and benzene. It is readily apparent that the use of a palladium compound activator or promoter in the catalytic mixture of Example 1 resulted in a substantial improvement in recovery of bromine values as HBr over the process of the non-palladium containing catalyst of the comparative example.

EXAMPLES 2–6

HBr is recovered from brominated methybenzene at temperatures of 200°, 350°, 400°, 500° and 600°C substantially as described in Example 1 using a catalyst of $PdCl_2$ on activated charcoal particles with a size of about 10 mesh and a BET of about 400 square meters per gram. A high conversion of the brominated methylbenzene to HBr and methylbenzene will be realized without as great an amount of dealkylation and transalkylation of the organic product as would occur if the $PdCl_2$ were not present. The reaction products can be separated by known means.

What is claimed is:

1. A process comprising reacting an aromatic bromide with hydrogen at a temperature within the range of from about 200° to about 600°C in the presence of a palladium activated catalyst to form hydrogen bromide; and recovering hydrogen bromide from the reaction products.

2. The process of claim 1 wherein the catalyst is a water soluble palladium compound.

3. The process of claim 2 wherein the palladium compound is in combination with a member selected from the group consisting of the oxides of chromium, vanadium, tungsten, cerium and molybdenum.

4. The process of claim 3 wherein the palladium compound-oxide combination is further in combination with a substrate selected from the group consisting of silica gel, alumina and charcoal.

5. The process of claim 2 wherein the palladium compound is in combination with a member selected from the group consisting of $Cr_2O_3$, $V_2O_3$, $V_2O_5$, $MoO_3$, $Mo_3O_8$, $MoO_2$, $CeO_2$, $WO_2$ and $W_2O_5$.

6. The process of claim 5 wherein the catalytic combination contains by weight about 0.1 to about 1 per cent $PdCl_2$, about 5 to about 25 per cent $Cr_2O_3$ and about 75 to about 95 per cent $Al_2O_3$.

7. The process of claim 2 wherein a palladium compound is $PdCl_2$.

8. The process of claim 1 wherein the catalyst is a combination of $PdCl_2$, $Cr_2O_3$ and $Al_2O_3$.

9. The process of claim 8 wherein $PdCl_2$ is present in an amount of from about 0.1 to about 2 weight per cent of the reactants.

10. The process of claim 8 wherein the aromatic bromide is 2,3,5-tribromoparaxylene.

11. The process of claim 10 wherein the reaction temperature is within the range of from about 280° to about 400°C.

12. The process of claim 11 wherein the molar ratio of hydrogen to 2,3,5-tribromoparaxylene is within the range of from about 1.5 to 1.0 to about 10 to 1.0.

13. The process of claim 1 wherein the aromatic bromide is brominated methylbenzene.

14. The process of claim 1 wherein the aromatic bromide is brominated 1,4-dimethylbenzene.

15. The process of claim 1 wherein the aromatic bromide is the 2,3-isomer of 2,5-dibromoparaxylene.

16. The process of claim 1 wherein the aromatic bromide is 2,3,5-tribromoparaxylene.

17. The process of claim 1 wherein the molar ratio of hydrogen to the aromatic bromide is within the range from about 1.1 to 1.0 to about 40 to 1.0.

18. The process of claim 1 wherein the molar ratio of hydrogen to the aromatic bromide is within the range from about 1.5 to 1.0 to about 10 to 1.0.

19. The process of claim 1 wherein the reaction temperature is within the range of from about 280° to about 400°C.

20. The process of claim 1 wherein the palladium compound is further in combination with a substrate selected from the group consisting of silica gel, alumina and charcoal.

21. The process of claim 8 wherein the $Al_2O_3$ is a particulate with a size within the range of from about 3 to about 20 mesh.

22. The process of claim 3 wherein the reaction temperature is within the range of from about 280 to about 400°C.

* * * * *